June 5, 1956 F. C. WILLIAMS ET AL 2,749,034

ELECTRONIC CIRCUIT FOR ADDING BINARY NUMBERS

Filed July 18, 1949 2 Sheets-Sheet 1

Frederic Calland Williams
Tom Kilburn
Inventors
By
Attorneys

ELECTRONIC CIRCUIT FOR ADDING BINARY NUMBERS

Filed July 18, 1949 2 Sheets-Sheet 2

Inventors
Frederic Calland Williams
Tom Kilburn
By Moore & Hall
Attorneys 2,749,034

ELECTRONIC CIRCUIT FOR ADDING BINARY NUMBERS

Frederic C. Williams, Timpereley, and Tom Kilburn, Davyhulme, Manchester, England, assignors to National Research Development Corporation, London, England, a corporation of Great Britain Application July 18, 1949, Serial No. 105,352

Claims priority, application Great Britain July 26, 1948

20 Claims. (Cl. 235—61)

The present invention relates to electronic circuits for carrying out the process of addition of binary numbers in which digits are represented by the presence or absence of a signal voltage. Such electronic circuits find application in binary digital computing machines.

The binary system of computation recognises only two figures, namely "0" and "1." The figure "1" can therefore be represented by the presence of a signal voltage and "0" by the absence of such voltage. In the process of addition, the addition of "1" and "1" gives "0" in the answer, with "1" to carry into the column of the next higher significant figure. In adding the next column, therefore it is necessary to take into account not only the two figures of the respective numbers to be added but also any figure to be added in, carried from the previously added column. An adding circuit, therefore, is required to accept three possible inputs, i. e. the two digits of the column to be added and a digit carried from a previously added column, to pass out an answer in the form of a "1" signal or a "0" signal and to feed back to the input for use in adding the next column a carry signal which may be a "0" or a "1."

According to this invention an electronic circuit for adding two binary numbers each represented by a train of pulses in which the digit "1" is represented by a pulse and the digit "0" is represented by the absence of a pulse comprises a first thermionic valve circuit, means for feeding the two trains of pulses representing the two numbers and a train of pulses representing "1" carry digits to said first thermionic valve circuit in a manner so that pulses representing digits of equal significance occur together, means for generating pulses representing undelayed "1" carry digits if two or three such pulses occur together in said first thermionic valve circuit, delaying means for delaying said pulses representing undelayed "1" carry digits whereby to obtain said train of pulses fed to said first thermionic valve circuit and representing "1" carry digits, a second thermionic valve circuit, means for feeding to said second thermionic valve circuit, the three trains of pulses fed to said first thermionic valve circuit and in a manner so that each pulse modifies a given current or voltage by a predetermined amount and in a given direction, means for additionally feeding to said second thermionic valve circuit said pulses representing undelayed "1" carry digits and in a manner such that each of these pulses modifies said given current or voltage by double said predetermined amount and in an opposite direction to said given direction, and means for generating answer pulses representing "1" carry digits if said given current or voltage is modified in said given direction by an amount greater than from one half of said predetermined amount to said predetermined amount.

In order that the invention may be more clearly understood and more readily carried into effect reference will now be made to the accompanying drawings in which.

Figure 1:
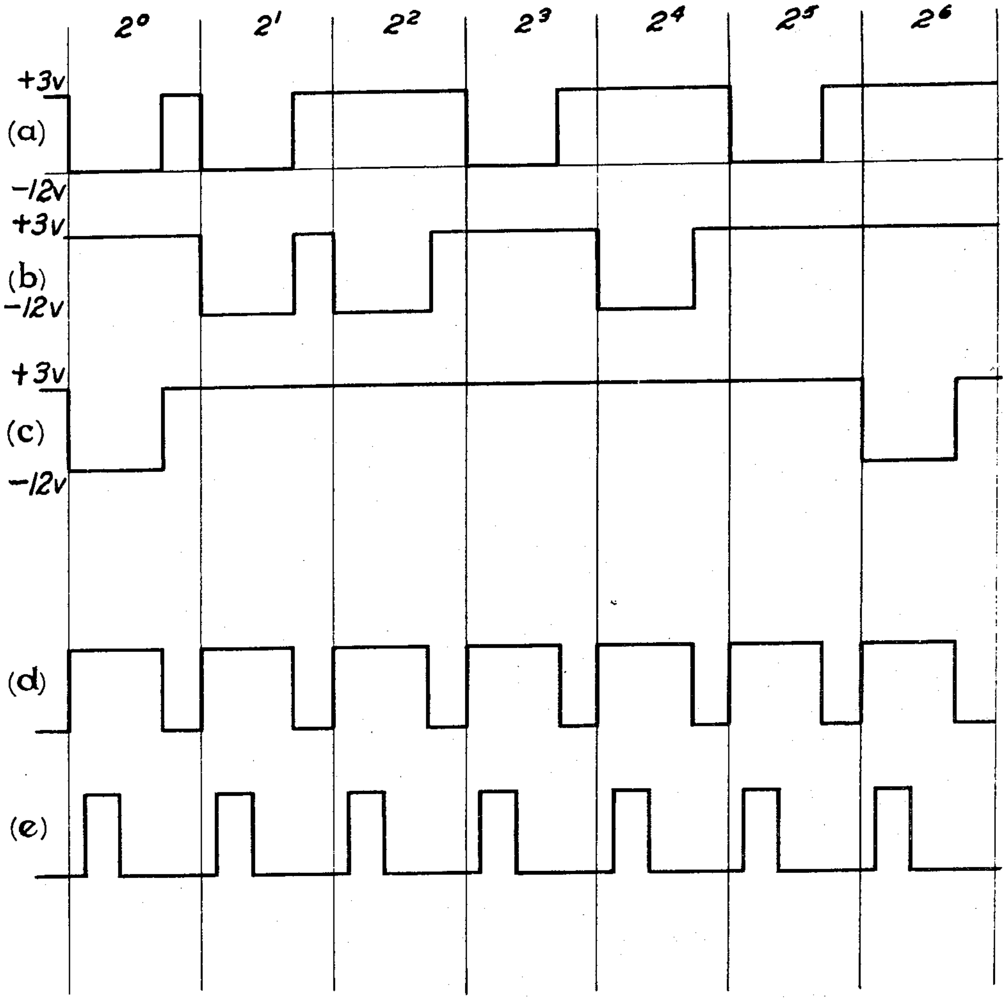
Fig. 1 shows waveforms illustrating the operation of a circuit according to the invention.

Referring first to Figure 1, waveform (*a*) shows the binary representation of the decimal number 43 as a train of pulses which are negative-going to approximately −12 v. from a normally quiescent or resting level of +3 v. Each negative-going pulse is indicative of the binary digit "1" and the absence of a pulse indicates the binary digit "0." The number in binary form is thus $$1.2^0+1.2^1+0.2^2+1.2^3+0.2^4+1.2^5+0.2^6$$

and the pulse train is consequently pulse, pulse, no pulse, pulse, no pulse, pulse, no pulse. The waveform (*b*) similarly represents the decimal number 22 in binary form (i. e. 0110100) while the waveform (*c*) shows the sum-representing signal for the decimal number 65 (i. e. in binary form 1000001).

The pulse trains of waveforms (*a*) and (*b*), Figure 1, may be derived from separate signal storage devices of any suitable kind such as devices of the supersonic delay line type well-known in the computing art and described, for example, in the various reports upon the EDVAC machine, 1945, 1946 and subsequently by the Moore School of Electrical Engineering, University of Pennsylvania, or, alternatively, of the cathode ray tube type as described in our copending prior United States patent application Ser. No. 50,136, filed September 20, 1948 for Electrical Storage Apparatus and patent application Ser. No. 93,612, filed May 16, 1949 for Information Storage Means. Such stores are illustrated schematically at ST1 and ST2 in Figure 2. The output leads 13, 13′ from each store constitute the source of input pulse signal trains to the input terminals T1 and T2 of the adding arrangement of the present invention.

The adding circuit of the invention shown and described later in connection with Figure 3 also utilises certain waveforms which are illustrated in diagrams (*d*) and (*e*), Figure 1. Diagram (*d*) illustrates so-called repetitive Dash pulses which are positive-going once during each digit interval of the pulse signal trains from a substantially zero potential resting level and coincident in timing with the "1" representing pulses of the input signal trains. These Dash pulses are generated by the Dash pulse generator illustrated schematically at DPG in Figure 2. An inverse or paraphase version of these Dash pulses is also available but is not illustrated. These inverse Dash pulses are negative-going instead of positive-going from a resting level of substantially zero potential. Since all the various other waveforms and in particular the "1" representing pulses of waveforms (*a*), (*b*) and (*c*) are derived from these Dash pulses, they constitute a common control means for governing the pulse repetition rate or digit interval timing of the signal trains. The Dash pulse generator is therefore equivalent to the usual master or clock oscillator of a series type computing machine. The Strobe pulse shown in diagram (*e*) comprises narrow pulses positive-going from a resting level of substantially earth or zero potential and with each pulse occurring shortly after the commencement of the related Dash pulse and in a given digit interval. These pulses are generated by a Strobe pulse generator illustrated schematically at SPG in Figure 2.

In order to understand the operation of the adding circuit shown in Figs. 2 and 3 it is first necessary to consider the table below which shows the eight possible combinations which can occur for the addition of two binary digits A, B and a carry digit $C_D$, from a previous addition, and the resulting sum Z and carry digit C:

| Possibility | 1st Digit A | 2nd Digit B | Carry digit from a previous addition $C_D$ | $X{:}A+B+C_D$ | Carry digit to be carried to next column $C$ | Sum $Z=X-2C$ |
|---|---|---|---|---|---|---|
| 1 | 0 | 0 | 0 | 0 | 0 | 0 |
| | 1 | 0 | 0 | | | |
| 2 | 0 | 1 | 0 | 1 | 0 | 1 |
| | 0 | 0 | 1 | | | |
| | 0 | 1 | 1 | | | |
| 3 | 1 | 0 | 1 | 2 | 1 | 0 |
| | 1 | 1 | 0 | | | |
| 4 | 1 | 1 | 1 | 3 | 1 | 1 |

It will be seen from the above table that the sum Z, given in the last column is always equal, on a numerical basis, to the sum X of the digits A, B and $C_D$ minus twice any digit C which is to be carried over to the addition of the next pair of digits in the binary numbers.

Figures 2, 3:
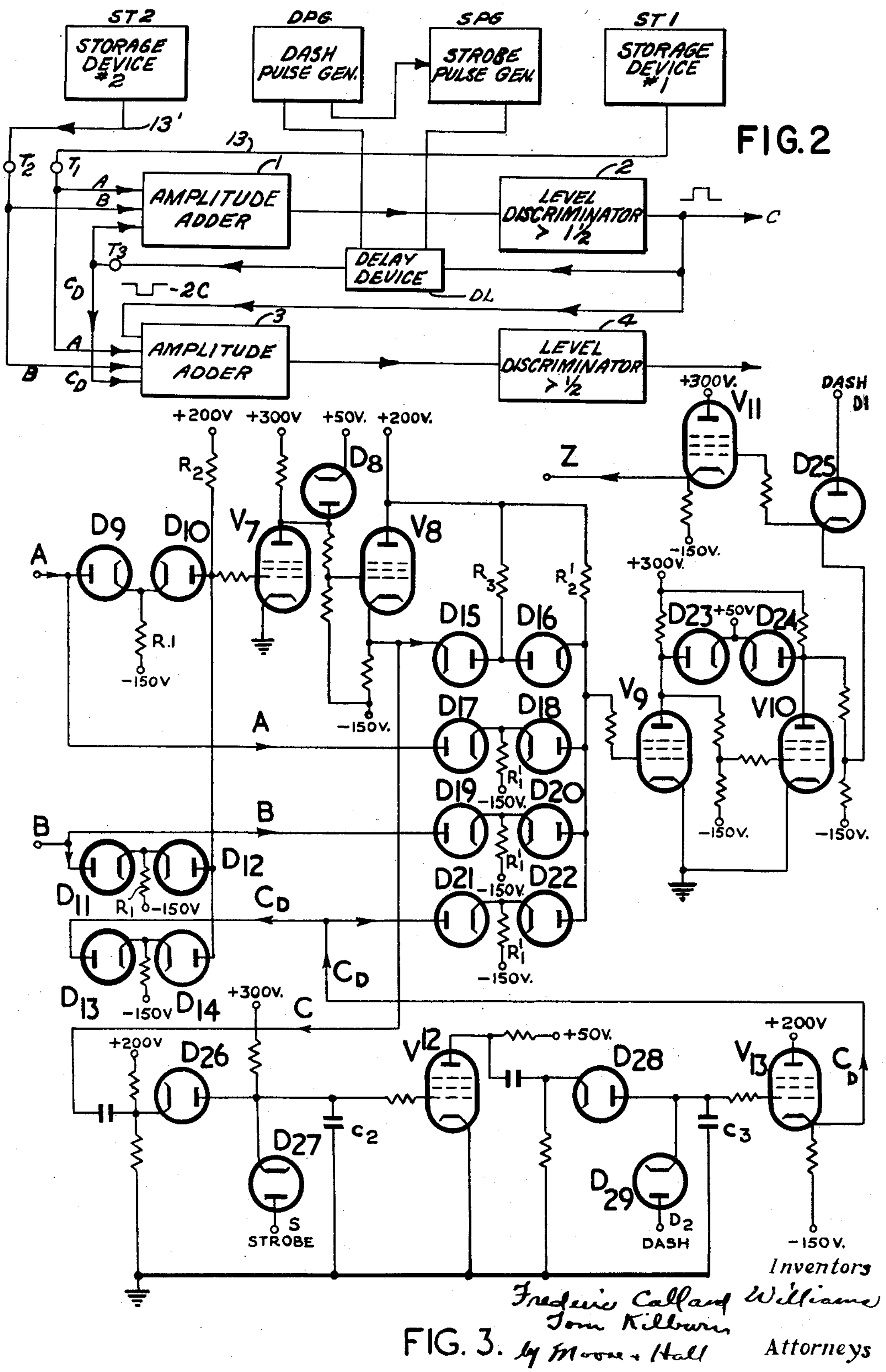
Fig. 2 shows a block schematic diagram of an adding circuit according to this invention and Fig. 3 shows in detail the block schematic diagram shown in Fig. 2.

The logical circuit arrangement for deriving the four possible combinations of answer Z and carry digit C is shown diagrammatically in Figure 2 of the accompanying drawings. The pulses corresponding to the input digits A are derived, through input terminal T1, from the storage unit ST1 while those corresponding to digits B are derived, through input terminal T2, from the second storage unit ST2. Carry digits $C_D$, applied at input terminal T3, are in this instance derived within the adding circuit itself in a manner which will be described later as a result of a previous addition operation. They are applied through the delay device DL. These input pulses A, B and $C_D$ (if present) are added in amplitude in an amplitude adding circuit 1 and the resultant pulse fed to an amplitude discriminating circuit 2 which produces a single pulse of unit amplitude (corresponding to a digit to be carried, C) if the combined amplitude $A+B+C_D$ is greater than approximately 1½ units. The carry digit C is thus only produced for possibilities 3 and 4 of the above table. A second amplitude discriminating circuit 4, arranged to produce an output pulse for inputs greater than approximately one half the standard pulse amplitude, is fed with the resultant pulse obtained by amplitude addition, in the amplitude adding circuit 3, of the pulses corresponding to digits A, B and $C_D$ and a reverse polarity double amplitude version (−2C) of any carry digit pulse C. An output pulse is thus only obtained from the amplitude discriminating circuit 4 in the case of possibilities 2 and 4 of the above table, and corresponds to the answer Z.

In the practical realisation of the system of Figure 2, shown in Figure 3 of the accompanying drawings, the addition of A, B and $C_D$ and the subsequent amplitude discrimination of elements 1 and 2 above is performed by diodes $D_9$—$D_{14}$ and valve $V_7$ while the addition of A, B, $C_D$ and −2C and the subsequent amplitude discrimination of elements 3 and 4 above is performed by diodes $D_{15}$—$D_{22}$ and valve $V_9$. Valves $V_{12}$, $V_{13}$ and associated diodes provides the equivalent of the carry delay circuit DL above and which accepts a carry digit C and stores it until the next digit period, to become the carry digit $C_D$.

"1" digits are represented in the circuit by dash-length pulses which are negative-going from an earth resting level, i. e. the inverse of those shown in Fig. 1(*d*) and these pulses are utilised as switching voltages to control preset currents instead of being added or subtracted directly. Each switching unit comprises a diode pair, such as $D_9$ and $D_{10}$ with a common resistor such as $R_1$ taken to a source of negative potential −150 v. The diode pairs $D_9$, $D_{10}$; $D_{11}$, $D_{12}$, $D_{13}$, $D_{14}$ are associated with a common resistor $R_2$ connected to the positive H. T. supply, and the junction of this resistor and the diodes $D_{10}$, $D_{12}$ and $D_{14}$ is connected to the grid of a valve $V_7$ whose cathode is connected direct to earth. The digits A are fed to the anode of diode $D_9$, while the digits B are applied to the anode of the diode $D_{11}$, and the carry digit $C_D$ from valve $V_{13}$ is fed to the anode of diode $D_{13}$. The ohmic value of each of the various resistors $R_1$ is 47,000 ohms while that of resistor $R_2$ is 41,000 ohms with the potentials of −150 v. and +200 v. as shown and with the diodes $D_9$—$D_{14}$ of type Mullard EA50 and valve $V_7$ of type Mullard EF50.

The switching operation is performed as follows: The valve $V_7$ with its cathode earthed and with its control grid connected by way of resistor $R_2$ to +200 v. is normally, i. e. in the quiescent condition with no "1" digit inputs, in the bottomed condition with its control grid taking grid current through resistor $R_2$. Under this quiescent condition the anodes of diodes $D_{10}$, $D_{12}$ and $D_{14}$ are at about earth potential whereas the anodes of diodes $D_9$, $D_{11}$ and $D_{13}$ are at the resting potential of the input waveforms (*a*), (*d*) and (*c*) Fig. 2 namely, approx. +3 v. above earth. The interconnected cathodes of each diode pair $D_9$, $D_{10}$, $D_{11}$, $D_{12}$ and $D_{13}$, $D_{14}$ will be accordingly also at about +3 v. earth potential due to the current flow through the related resistors $R_1$ and the diodes $D_9$, $D_{11}$, $D_{13}$. As the potential of the cathodes of diodes $D_{10}$, $D_{12}$ and $D_{14}$ is, under these quiescent conditions, slightly higher than that of the related anodes, these diodes $D_{10}$, $D_{12}$ and $D_{14}$ are cut-off and the resistor $R_2$ is carrying only the grid current required by the valve $V_7$.

If the anode of any one of the diodes $D_9$, $D_{11}$, $D_{13}$ is driven negative by an applied "1" digit pulse, that diode will be cut-off and the other diode of the pair simultaneously turned-on since its cathode potential will automatically drop until it is more negative than its anode. When this occurs the previous current flow through resistor $R_1$ and diode $D_9$, $D_{11}$ or $D_{13}$ is diverted to diode $D_{10}$, $D_{12}$ or $D_{14}$ and thence through resistor $R_2$. Provided the current so required for supplying the diode circuit does not exceed that previously drawn as grid current through the valve $V_7$, such change can take place without appreciable alteration of the potential at the control grid of valve $V_7$ by a process of subtraction from such grid current, the latter automatically adjusting itself in value such as will maintain the control grid at earth or cathode potential. If, however, the current required to satisfy the additional drain through the diode circuits is greater than that being drawn as grid current through the valve $V_7$, such grid current will cease and by reason of the increased current through resistor $R_2$ the potential at the control grid of the valve $V_7$ will be abruptly lowered and may, if sufficient in extent, cause cut-off of the valve.

The value of resistor $R_2$ is so adjusted, relative to the grid current of the valve and the related resistors $R_1$ of the three diode pairs that each diode pair controls one unit of current and that 1½ units of current constitute the normal grid current flow in quiescent conditions. In consequence of this if any single one of the diodes $D_9$, $D_{11}$, $D_{13}$ is cut-off the additional current diverted through the related diode $D_{10}$, $D_{12}$, $D_{14}$ will not cause appreciable alteration at the control grid of valve $V_7$ but merely causes a corresponding diminution of the grid current in the valve. If, however, two or three of the diodes $D_9$, $D_{11}$, $D_{13}$ are cut-off simultaneously then the total cessation of grid current in valve $V_7$ is still inadequate to compensate for the additional current required for the diodes $D_{10}$, $D_{12}$ or $D_{14}$ and the current flow through resistance $R_2$ is increased to the point where the control grid potential of valve $V_7$ drops below cut-off value. When the valve $V_7$ is cut off its anode potential rises abruptly to the level of +50 v. where it is caught by the diode $D_8$. The resultant positive pulse is fed to the control grid of a cathode follower valve $V_8$ and the pulse appearing across the cathode resistance of this valve provides the carrying digit C which is fed to the carry digit store $V_{12}$—$V_{13}$ and to the second amplitude adder. In one practical embodiment the resistors $R_2$ had the value 41,000 ohms and each of the resistors $R_1$ had the value 47,000 ohms. If the particular valve chosen for $V_7$ is not capable of passing the required grid current, an additional diode across its control grid cathode path may be inserted in the circuit.

It will be noticed that the diodes $D_9$—$D_{14}$ which are adding negative pulses are similarly connected and have the switched resistors $R_1$ returned to a negative voltage source. A positive pulse is caused to subtract from the resultant effect by returning the appropriate switched resistor to a positive voltage source and reversing the switching diodes.

The addition of pulses corresponding to digits A, B and $C_D$ and the subtraction of a pulse corresponding to 2C is performed by the diode pairs $D_{17}$, $D_{18}$; $D_{19}$, $D_{20}$; $D_{21}$, $D_{22}$; $D_{15}$, $D_{16}$, in conjunction with the valve $V_9$. Diode pairs $D_{17}$, $D_{18}$; $D_{19}$, $D_{20}$ and $D_{21}$, $D_{22}$ in conjunction with switched resistors $R_1{}^1$ (of value 68,000 ohms each) function in exactly the same manner as previously described and are fed with the pulses corresponding to digits A, B and $C_D$, while diodes $D_{15}$, $D_{16}$ are reversely connected and have the value (45,000 ohms) of the switched resistance $R_3$ so adjusted that a subtraction of two units occurs for a C pulse which is fed to diode $D_{15}$ from the cathode follower $V_8$. The common resistor $R_2{}^1$ has its value (180,000 ohms) so selected that it is effective to subtract ½ unit of current from the current diverted to the grid of the valve $V_9$ by the swtiching diodes. This results in the valve $V_9$ being cut-off when $A+B+C_D-2C$ is greater than ½. Selection of the value ½ gives adequate discrimination between the cases when $$A+B+C_D-2C$$

are 0 and 1 and thus a positive pulse limited to +50 volts by the diode $D_{23}$ is developed at the anode of the valve $V_9$ in those instances when the answer "Z" should be "1." This positive pulse is inverted by valve $V_{10}$ and after being reshaped (on the back edge only) by the dash wave-form shown in Fig. 1(*d*) fed via terminal $D_1$ and diode $D_{25}$, is fed to the control grid of cathode follower valve $V_{11}$. A diode $D_{24}$ is provided to fix the positive limit of the anode voltage excursion of valve $V_{10}$: A negative dash pulse is thus obtained at the cathode of the valve $V_{11}$ when, as a result of an addition operation, a "1" is obtained as the answer digit.

The operation of the carry digit store circuit remains to be described. Each positive pulse (C) obtained from the cathode follower valve $V_8$ is differentiated and fed to the control grid of the valve $V_{12}$ via a diode $D_{26}$ so that the valve $V_{12}$ is cut-off by the back edge of the pulse and by virtue of the condenser $C_2$ in the grid circuit remains cut off until the occurrence of the strobe pulse shown in Fig. 1(*e*), corresponding to the next digit period, which is fed in positive-going sense through terminal S and diode $D_{27}$. When anode current commences to flow again in the valve $V_{12}$, the negative going edge of the anode voltage waveform is fed through diode $D_{28}$ to the grid of the cathode follower valve $V_{13}$. On account of the condenser $C_3$ the grid of valve $V_{13}$ then remains negative until the end of the dash period when the grid is driven positively by the dash waveform fed via terminal $D_2$ and diode $D_{29}$. The cathode follower thus delivers a negative pulse (the carry digit $C_D$) one digit period later than the digit C was applied to the circuit and the performance of the circuit is unaffected by small variations of the digit period. This negative pulse commences coincidently with the leading edge of a strobe pulse and terminates coincidently with the leading edge of a dash pulse.

We claim:

1. An electronic circuit for adding two binary numbers each represented by a train of pulses in which the digit "1" is represented by a pulse and the digit "0" is represented by the absence of a pulse and comprising a circuit including a first thermionic valve having a grid, means for feeding the two trains of pulses representing the two numbers and a train of pulses representing "1" carry digits to said first thermionic valve grid in a manner so that pulses representing digits of equal significance occur together, said means including three input switches respectively triggered by the three trains of pulses, and also including control means whereby each of said switches, when triggered, equally affects the potential of said grid, said circuit including means for generating pulses representing undelayed "1" carry digits if two or three such pulses occur together in said first thermionic valve grid, delaying means for delaying said pulses representing undelayed "1" carry digits whereby to obtain said train of pulses fed to said first thermionic valve grid and representing "1" carry digits, a second thermionic valve circuit, means for feeding to said second thermionic valve circuit the three trains of pulses fed to said first thermionic valve grid and including means whereby each pulse modifies a given current or voltage by a predetermined amount and in a given direction, means for additionally feeding to said second thermionic valve circuit said pulses representing undelayed "1" carry digits including means whereby each of these pulses modifies said given current or voltage by double said predetermined amount and in an opposite direction to said given direction, and means for generating answer pulses representing carry "1" digit if said given current or voltage is modified in said given direction by an amount greater than one half of said predetermined amount to said predetermined amount.

2. An electronic circuit according to claim 1 wherein said circuit comprises a first thermionic valve which is normally conducting, said control means including means whereby each pulse applied to said first thermionic valve circuit causes a predetermined unit of current to be diverted to the control grid circuit of said first valve and in which the diversion of more than 1½ units of current to the control grid circuit cuts off the anode current of said first valve and thereby causes a pulse representing a "1" undelayed carry digit to be generated at the anode of said first valve.

3. An electronic circuit according to claim 1 wherein said second thermionic valve circuit comprises a second thermionic valve which is normally conducting, said second valve having a control grid, means whereby each pulse applied to said second thermionic valve circuit causes a predetermined unit of current to flow to the control grid circuit of said second valve, and means whereby each pulse in the pulses representing undelayed "1" carry digits causes two units of current to be subtracted from the control grid circuit of said second valve and in which the diversion of more than one half such unit of current to the control grid circuit cuts off the anode current of said second valve and thereby causes a pulse representing a "1" answer digit to be generated at the anode of said second valve.

4. An electrical circuit arrangement for the addition of a plurality of binary digital numbers each of which is represented by a train of pulses including a first addition circuit comprising a separate input circuit for receiving each train of pulses, a main circuit including a source of potential to effect current flow therethrough, separate control means in each input circuit triggered by input pulses for equally modifying the current flow in the main circuit irrespective of the amplitudes of pulses of the trains; a second addition circuit similar to the first addition circuit, delay means deriving a carry digit impulse train from said first addition circuit and feeding the same to said second addition circuit with an imposed time delay equal to the inter-pulse time of said trains of pulses, and means for deriving a train of pulses characteristic of the desired answer from the second addition circuit.

5. An electrical circuit arrangement as defined in claim 4 in combination with strobe pulse generator means for producing strobe pulses in timed relation with the information pulses of said trains of pulses, said delay means including trigger means controlled by said strobe pulses for delaying the carry digit impulses by the time duration between consecutive pulses of the information pulse trains.

6. In a device for adding binary numbers, a first addition circuit, a second addition circuit similar to the first, a carry digit circuit for feeding a carry digit from the first circuit to the second circuit, said carry digit circuit including delay means for delaying the carry digit, input terminals for receiving digital information in the form of trains of pulses for application to both of said addition circuits, and common means for controlling the repetition rate of the pulses of said trains and for controlling the delay period of said delay means to effect a period of delay by the latter equal to the shortest period between pulses of said trains.

7. A device as defined by claim 6 having output circuit means coupled to the second addition circuit, said output circuit means being controlled by said common means for modifying the shape of the output pulses.

8. An electronic circuit arrangement for the addition of at least two binary numbers represented by at least two trains of pulses of two states comprising an input having at least two input terminals for respectively receiving said trains of pulses, a first main current path means passing a first predetermined current, first circuit means coupled to said first main current path means and to said input terminals to alter said first predetermined current in response to the input pulses on said input terminals, first pulsing means including means coupled to said first main current path means and responsive to the level of current in said first main current path means to operate said first pulsing means when said current in said first main current path means reaches a predetermined level, said first pulsing means having an output, a second main current path means passing a second predetermined current, second circuit means coupled to said second main current path means and to said input terminals to alter said second predetermined current in response to the input pulses on said input terminals, second pulsing means including means coupled to said second main current path means and responsive to the level of current in said second main current path means to operate said second pulsing means when said current in said second main current path means reaches a predetermined level, and means coupling the output of said first pulsing means to said second main current path means.

9. Apparatus as claimed in claim 8 wherein said first circuit means and said second circuit means comprise all of the following in combination with each input terminal, a unilateral conducting device having an anode connected to the input terminal and also having a cathode, a second unilateral conducting device having a cathode connected to the cathode of the first unilateral conducting device and also having an anode, a resistor connecting said cathodes to negative potential, and means connecting the anode of the second unilateral conducting device to its complementary main current path means.

10. Apparatus as claimed in claim 8 wherein said first circuit means comprises a plurality of first shunt current path means each including first switching means controlled by changes of potential on one of said input terminals for selectively connecting its complementary first shunt current path means across a part of said first main current path means in response to changes of potential on said input terminal.

11. Apparatus as claimed in claim 10 wherein said second circuit means comprises a plurality of second shunt current path means each including second switching means controlled by changes of potential on one of said input terminals for selectively connecting its complementary second shunt current path means across a part of said second main current path means in response to changes of potential on its complementary input terminal.

12. Apparatus as claimed in claim 8 including delay means connected to the output of said first pulsing means to delay the same for a period equal in time to that between successive pulses of said trains of pulses, and means coupling the output of said delay means to said second main current path means.

13. Apparatus as claimed in claim 12 wherein said last named means includes an additional shunt current path means, and additional switching means connecting said additional shunt current path means across said second main current path means in response to pulse output from said delay means.

14. In apparatus for adding binary numbers represented in serial form by pulse signal trains, a first addition circuit comprising an electron discharge device with a control grid, and a first control circuit including said control grid; a second addition circuit comprising an electron discharge device having a control grid, a second control circuit controlling the potential on the last-named grid; means for feeding the pulses representing the binary numbers to be added to both of said addition circuits to thereby apply potentials to said control circuits, means for deriving a pulse potential representative of the carry digit from the first circuit, means for delaying said pulse by a time interval equal to that between adjacent pulse positions of said trains and varying the potentials of said control circuits thereby; and means for deriving a pulse potential of twice the amplitude of the carry digit pulse and for applying such pulse potential to said second control circuit to thereby affect said last-named grid.

15. In an electronic circuit arrangement for the addition of numbers represented in the binary scale of notation by trains of pulses, a plurality of input terminals respectively receiving the trains of pulses to be added, a first addition circuit coupled to said input terminals comprising first pulsing means and first control means responsive to the pulses received by said input terminals to operate said first pulsing means and thereby produce a train of pulses representative of carry digits, a second addition circuit operatively connected to said input terminals comprising second pulsing means and second control means responsive to the pulses received by said input terminals to operate said second pulsing means and thereby produce a train of pulses representative of significant digits, said second control means including a thermionic valve having at least an anode, cathode and control grid, a grid circuit having a source of positive potential coupled to said control grid for causing a current to flow in the grid-cathode circuit of said valve, a plurality of pairs of unilaterally conducting devices coupled to said control grid and respectively coupled to said input terminals, said unilaterally conducting devices each having an anode and a cathode, the cathodes of pairs of said unilaterally conducting devices being connected together, the anode of one of the unilaterally conducting devices being connected to an input terminal, the anode of the other unilaterally conducting device of each pair of said pairs of unilaterally conducting devices being coupled to the control grid of said thermionic valve, and additional pair of unilaterally conducting devices coupled to the output of said first pulsing means and to the control grid of said thermionic valve, said additional unilaterally conducting devices having anodes coupled together and each also having a cathode, the cathode of one of said unilaterally conducting devices of said additional pair of unilaterally conducting devices being coupled to the output of said first pulsing means, and the other cathode of said additional pair of unilaterally conducting devices being coupled to the control grid of said thermionic valve, said pairs of unilaterally conducting devices causing the current in said grid-anode circuit to be altered in response to the pulse trains being received, said additional pair of unilaterally conducting devices causing current to flow in said grid-anode circuit which opposes current flow resulting from the action of said plurality of pairs of unilaterally conducting devices.

16. A circuit as claimed in claim 15 having a resistance in the grid circuit of said thermionic valve, said resistance in the grid circuit of said thermionic valve, said resistance being connected between said source of positive potential and said control grid of said thermionic valve.

17. For an electronic computing circuit, an amplitude discriminating arrangement which comprises an electron discharge tube having at least a cathode, a control grid and an anode, a source of positive potential relative to said cathode of said tube, a source of negative potential relative to said cathode of said tube, a first resistor connected between said control grid and said source of positive potential, a first pair of unilaterally conductive devices having their cathode-forming terminals interconnected, a second resistor connected between said interconnected cathode-forming terminals and said source of negative potential, circuit means connecting the anode-forming terminal of one of said unilaterally conductive devices to said control grid, a first input terminal, means connecting the anode-forming terminal of the other of said pair of unilaterally conductive devices to said first input terminal, a second pair of unilaterally conductive devices having their anode-forming terminals interconnected, a third resistor connected between said interconnected anode-forming terminals and said source of positive potential, circuit means connecting the cathode-forming terminal of one of said second pair of unilaterally conductive devices to said control grid, a second input terminal, and circuit means connecting the cathode-forming terminal of the other of said second pair of unilaterally conductive devices to said second input terminal.

18. For an electronic computing circuit, an amplitude discriminating arrangement which comprises a thermionic valve having at least a cathode, a control grid and an anode, circuit means connecting said cathode to earth, a first source of potential having its negative terminal connected to earth, a second source of potential having its positive terminal connected to earth, a first resistor connected between said control grid and the positive terminal of said first source of potential, a first pair of diodes having their cathodes interconnected, a second resistor connected between said interconnected cathodes and the negative terminal of said second source of potential, circuit means connecting the anode of one of said diodes to said control grid, a first input terminal, means connecting the anode of the other of said diodes to said first input terminal, a second pair of diodes having their anodes interconnected, a third resistor connected between said anodes interconnected and the positive terminal of said first source of potential, circuit means connecting the cathode of one of said second pair of diodes to said control grid, a second input terminal, and circuit means connecting the cathode of the other of said second pair of diodes to said second input terminal.

19. For an electronic computing circuit, an amplitude discriminating arrangement which comprises an electron discharge tube having at least a cathode, a control grid and an anode, a source of positive potential relative to said cathode of said tube, a source of negative potential relative to said cathode of said tube, a first resistor connected between said control grid and said source of positive potential, at least two pairs of unilaterally conductive devices, the cathode-forming terminals of each pair being interconnected, separate resistors connected respectively between each of said interconnected pairs of cathode forming terminals and said source of negative potential, circuit means connecting the anode-forming terminal of one device of each pair of unilaterally conductive devices to said control grid, at least two separate input terminals and further circuit means connecting the anode-forming terminals of each of the other unilaterally conductive device of said pairs of devices to separate ones of said input terminals.

20. For an electronic computing circuit, an amplitude discriminating arrangement which comprises a thermionic valve having at least a cathode, a control grid and an anode, circuit means connecting said cathode to earth, a first source of potential having its negative terminal connected to earth, a second source of potential having its positive terminal connected to earth, a first resistor connected between said control grid and the positive terminal of said first source of potential, at least two pairs of diodes, the cathodes of each pair being interconnected, separate resistors connected respectively between each of said interconnected cathodes and the negative terminal of said second source of potential, circuit means connecting the anodes of one diode of each pair of diodes to said control grid, at least two separate input terminals and further circuit means connecting the anodes of each of the other diodes of said pairs to separate ones of said input terminals.

References Cited in the file of this patent

UNITED STATES PATENTS

| | | |
|---|---|---|
| 2,429,227 | Herbst | Oct. 21, 1947 |
| 2,503,765 | Rajchman et al. | Apr. 11, 1950 |
| 2,543,442 | Dench | Feb. 27, 1951 |
| 2,557,729 | Eckert | June 19, 1951 |

OTHER REFERENCES

"Second Interim Progress Report on the Physical Realization of an Electronic Computing Instrument," Bigelow et al., Institute for Advanced Study, Princeton, N. J., July 1, 1947, Fig. 47.